Aug. 12, 1958  V. M. TYLER ET AL  2,846,869
SHOCK IMPULSE TESTING APPARATUS
Filed Oct. 1, 1956  3 Sheets-Sheet 1

INVENTORS
VERNAL M. TYLER,
JOHN R. GRAY,
HOMER I. SARGEANT.
BY
ATTORNEY

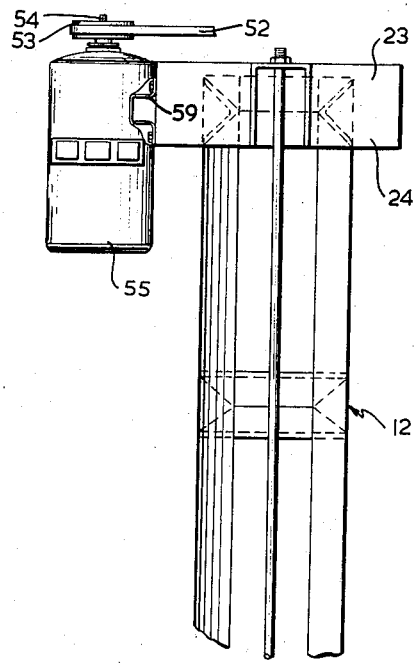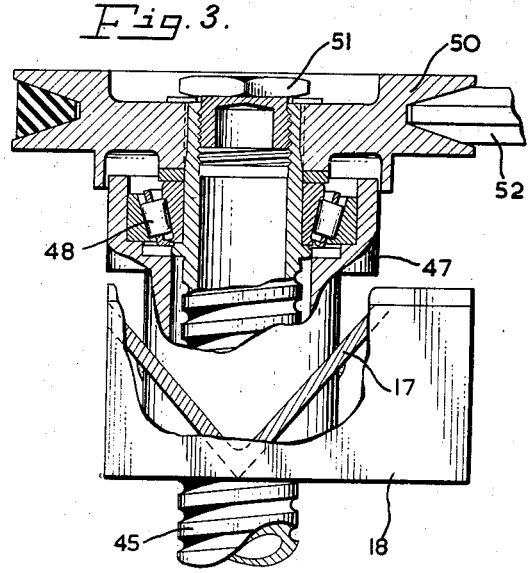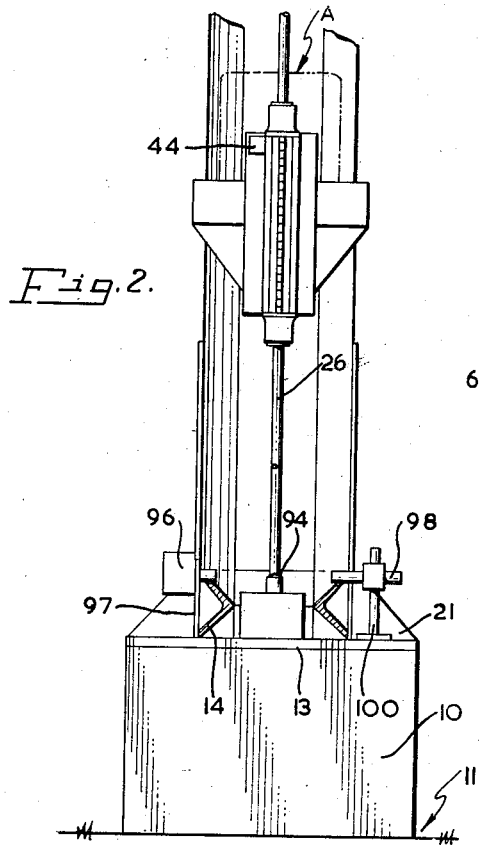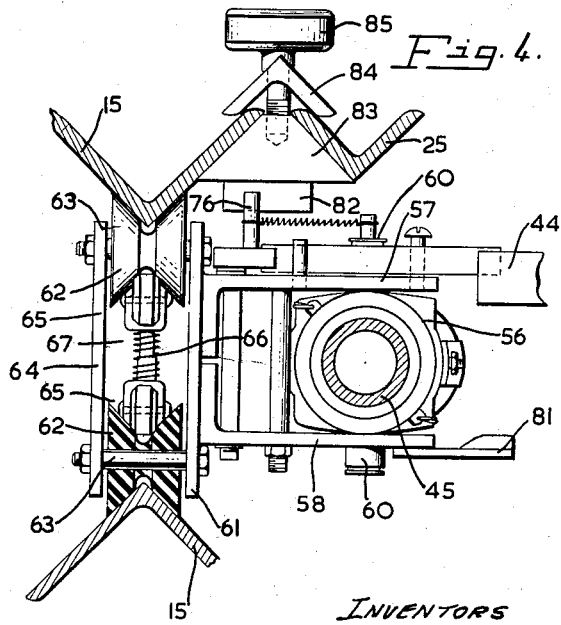

Aug. 12, 1958    V. M. TYLER ET AL    2,846,869
SHOCK IMPULSE TESTING APPARATUS
Filed Oct. 1, 1956    3 Sheets-Sheet 3
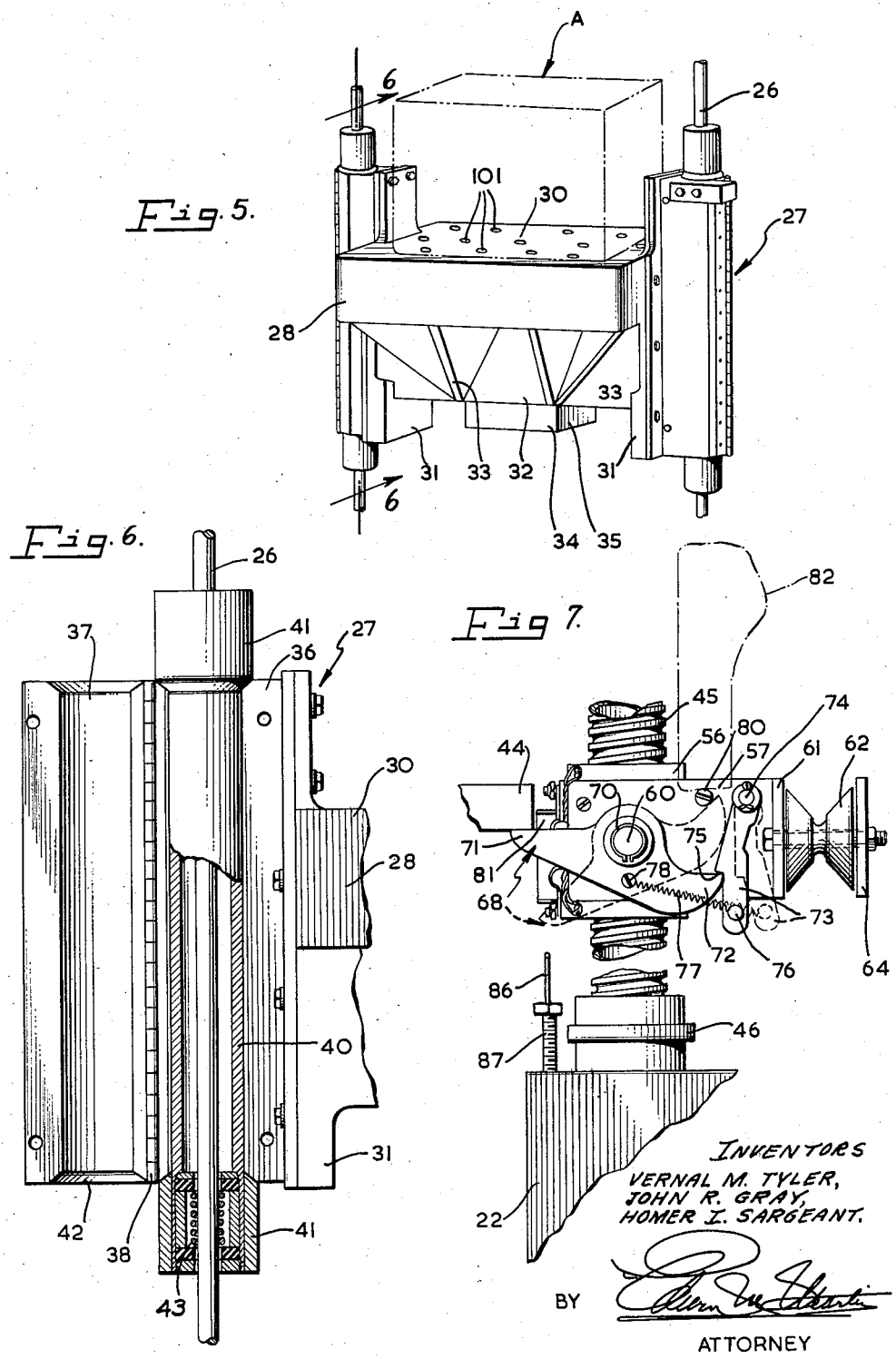
INVENTORS
VERNAL M. TYLER,
JOHN R. GRAY,
HOMER I. SARGEANT.
BY
ATTORNEY United States Patent Office 2,846,869
Patented Aug. 12, 1958

2,846,869

SHOCK IMPULSE TESTING APPARATUS

Vernal M. Tyler, Rolling Hills, John R. Gray, Los Angeles, and Homer I. Sargeant, Anaheim, Calif., assignors to Hughes Aircraft Company, Culver City, Calif., a corporation of Delaware Application October 1, 1956, Serial No. 614,778

3 Claims. (Cl. 73—12)

The present invention relates generally to a testing device and relates more particularly to a drop tower or shock testing device that is employed to impart a saw-tooth shaped shock wave to articles, proper testing of which requires such handling.

Many devices such as, for example, electronic structures, articles and components must in use be subjected to considerable shock. In order that such items may be reliable while in service, it is necessary to ascertain whether or not these articles will withstand certain maximum shocks that are either equal to or in excess of like shocks produced in use.

Shock impulses, such as those applied to electronic apparatus or delicate instrumentation by gun or rocket blasts, rough handling, dropping, etc., differ widely from accelerations which might be applied thereto by a centrifuge, in that these normally encountered shock impulses excite considerable structural resonance. The response to the shock impulse within the structure varies from one point to another and is frequently several times the peak of applied acceleration. For this reason, the more common methods of describing shock severities in terms of peak acceleration and rise time or duration, are inadequate.

In analyzing any shock severity it must be assumed that the vulnerable unit of hardware consists of structure that is mounted to a relatively rigid base plate or frame, that the acceleration-time function is known for the base plate or whatever the hardware may in turn be mounted to, and that any damage to the unit is due entirely to this motion. It has been demonstrated that with such precautions, the shock spectrum, which consists essentially of the peak responses of a reed gage, is valuable for describing and comparing the severities of such shocks even when the structure under test has either damped or multiple resonances.

Shock spectra are computed for a number of simple pulse shapes. Thus, it is possible to specify shock tests in terms of the shock spectra, or in terms of simple pulses chosen to have a shock spectrum at least as severe at every frequency as that of the shock impulse to be simulated. A saw-tooth type shock wave is one of these simple pulse shapes and the device of this invention easily provides this form of shock impulse.

Heretofore many attempts have been made toward the production of simplified machinery to accomplish similar types of shock impulse testing; however, under production conditions, it is necessary that extreme reliability and repeatability of the test be available without the necessity for elaborate and time consuming setup procedures or result analysis. Furthermore, it is necessary that equipment of this type be of such a nature as to enable use by relatively unskilled operators under production conditions.

It is, accordingly, one important object of the present invention to provide a novel apparatus for imparting a saw-tooth shaped shock impulse wave to articles wherein such tests are desirable.

It is another important object of the invention to provide a drop tower together with a deceleration arrangement that is simple in construction, reliable and automatic in operation, efficient in use and which has a high degree of repeatability in producing a desired shock impulse to articles carried by a movable platform forming a portion of the drop tower.

It is a further important object of this invention to provide a production apparatus for use in continuous testing of various articles for determination of the reliability of these articles by producing a shock impulse, commensurate with similar impulses that will be encountered during use of the article.

Other and further important objects of the invention will become apparent from the disclosures in the following detailed specification, appended claims and accompanying drawings, wherein:

Fig. 2 is a vertical sectional view through the apparatus, as taken substantially as indicated by line 2—2, Fig. 1;

Fig. 3 is an enlarged fragmentary sectional view of a screw supporting and driving mechanism as employed herewith;

Fig. 4 is an enlarged sectional view of the carriage support and latch mechanism, as taken substantially as indicated by line 4—4, Fig. 1;

Fig. 5 is a perspective view showing the movable platform of the present invention;

Fig. 6 is an enlarged sectional view of a portion of the carriage guide mechanism, as taken substantially as indicated by line 6—6, Fig. 5, and showing components in an open position;

Fig. 7 is an enlarged, fragmentary, partially sectional view showing the platform support and latch mechanism employed herewith;

Figure 1:
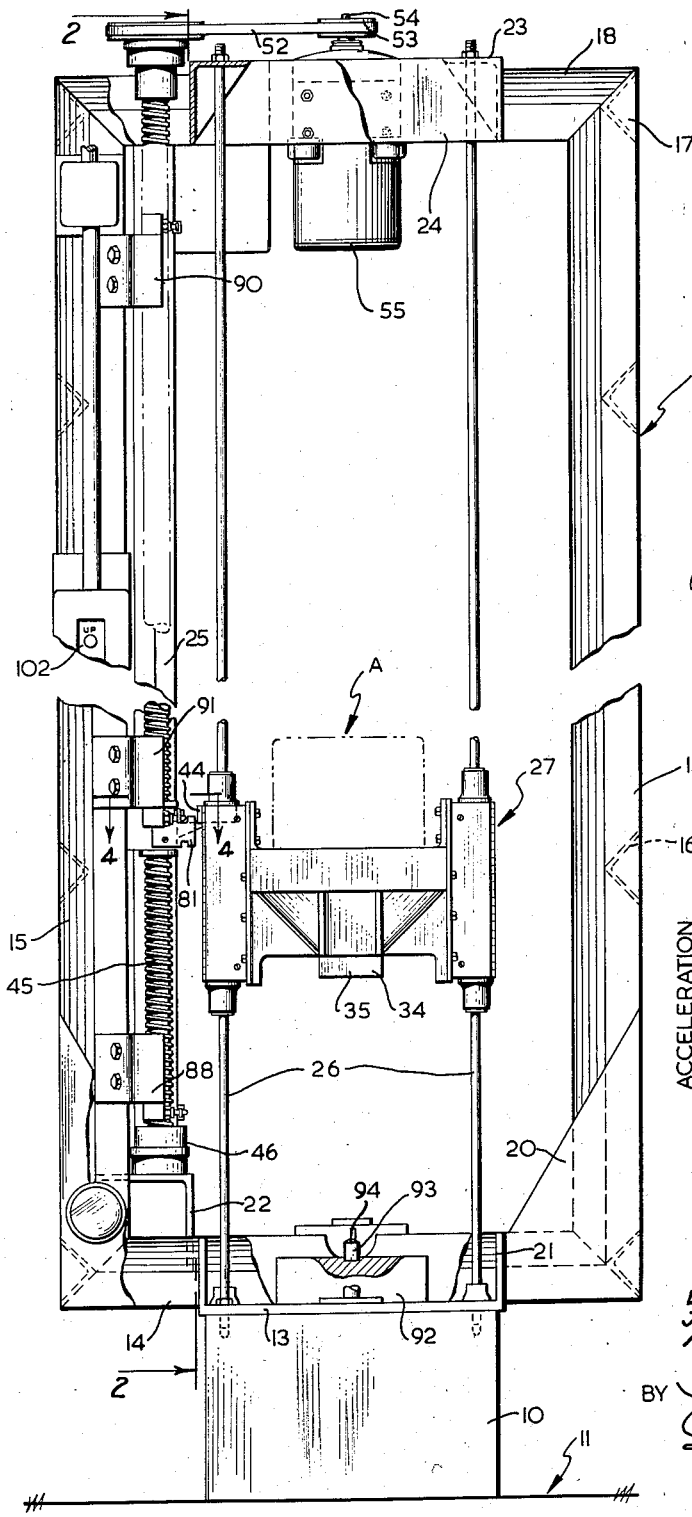
Figure 1 is a front elevational view of the present drop tower with portions broken away for clarity.

With reference to the drawings, the device hereof includes a large mass, having base structure 10 that is positioned on a suitable surface 11. A tower frame structure, indicated generally at 12 is mounted on the base 10. The frame structure includes a horizontally disposed base plate member 13 having a pair of laterally extending V-shaped cross members 14 secured thereto. The base plate member 13 also serves to support pairs of vertically extending V-shaped frame members 15 that are braced by means of transverse members 16 and which are joined at the upper ends thereof by means of lateral cross members 17 and longitudinal cross members 18. The lower portions of the tower structure 12 are further braced by means of triangular webs 20 and angle bracing 21. The generally rectangular frame thus produced is adapted to support the desired mechanism and provide a rigid enclosure therefor.

Additionally, the frame 12 serves, at the lower end thereof, to support an angle member 22 and at the upper end thereof a pair of angle members 23. The angle members 23 and lateral side plates 24 secured thereto thus to form a boxed-in enclosure. Furthermore, a guide channel 25, that is also V-shaped in cross section, is secured at upper and lower ends thereof to the frame structure and is disposed in slight spaced relationship to one of the frame members 15, Figs. 1 and 4. The frame structure 12 and the various components thereof may all be secured together as by means of welding, or the like, in order to provide a unitary structure having sufficient rigidity for the purpose of this invention.

As shown in Figs. 1 and 2, a pair of vertically disposed parallel rods 26 have their lower ends secured to the base plate 13 and the base block 10, and the upper ends thereof secured to the frame angle members 23. A carriage or platform, indicated generally at 27, is slidably guided by the rods 26. As shown in Figs. 1, 5 and 6, the platform 27 is a large mass, relatively heavy structure having a plate portion 28 that has a horizontally disposed upper surface 30. The plate portion 28 is integrally connected to vertically disposed side members 31 and has a rib 32 extending downwardly therefrom, there being suitable integral braces 33 extending between the rib and the plate portion. A strike member 34, having a lower planar surface 35, is carried integrally by a lower portion of the supporting structure for the plate 28. The side members 31 of the plate 28 are secured, as by bolting or the like, to an elongated split cap 36 having a section 37 hingedly connected thereto by means of elongated hinge 38. When closed, the sections 36 and 37 cooperate to form an elongated bore therein. As shown in Fig. 6, an elongated sleeve 40 is adapted to be secured in the bore defined by the sections 36 and 37, with movement of the platform supporting mechanism relative to the sleeve 40 being limited by collars 41, carried by ends of the sleeve 40 and engageable in countersunk ends 42 in the members 36 and 37. Opposite ends of the sleeve 40 are adapted to carry suitable resiliently mounted roller bushings 43 that cooperate with the rods 26 in smoothly guiding movement of the platform with respect to these rods. One of the guide mechanisms for the platform 27 has a tab 44 that is depended laterally therefrom, for a purpose to be hereinafter more fully described.

As shown in Fig. 1, an elongated screw 45 is journalled, at the lower end thereof in a collar 46 that is secured to the angle member 22. Suitable bearing means (not shown) may be encased within the collar 46. As shown in Fig. 3, the upper end of the screw 45 extends through a collar 47 that is secured to one of the lateral cross members 17. This upper end of the screw 45 is journalled in a suitable bearing 48 carried by the collar 47 and extends beyond the collar, a pulley 50 being secured to this extended end by means of a nut 51. The pulley 50 is engaged by a V-belt 52 that extends to a second pulley 53 mounted on a shaft 54 of a driving motor 55. The motor 55 is mounted on suitable brackets 59 that are in turn secured to one of the side plate members 24. It may be seen that operation of the motor will drive the screw 45. For a purpose to be hereinafter more fully described, the motor 55 is of the bi-directional type.

As shown primarily in Figs. 4 and 7, a nut 56 is positioned on the threads of the screw 45. A pair of angle members 57 and 58 are secured to the nut 56 by means of stub shafts 60 whereby to be pivotally supported by the nut. The angle members 57 and 58 are further secured, along adjacent edges thereof, to a plate 61 that serves to support a pair of V-shaped rollers 62, as by means of shafts 63 and an outer plate 64. The rollers 62 are adapted for cooperation with a pair of the vertically disposed frame members 15 and are urged into contact with the longitudinal apexes of the members 15 by means of two pairs of pressure rollers 65 that are telescopically joined as at 66 and urged outwardly from each other and into contact with the rollers 62 by means of a compression spring 67. The rollers 65 serve to maintain the rollers 62 in constant contact with the members 15 and compensate for any variations in the parallel relationships of the members 15.

Thus, upon rotation of the screw 45, the nut 56 will travel in one direction or another, depending upon the direction of rotation of the motor 55, and the plates defined by the angle members 57 and 58 will move therewith in a smooth manner as guided by the rollers 62 and their cooperation with the vertical rails defined by the frame members 15.

As shown again primarily in Figs. 4 and 7, the angle member 57 and the side plate portion thereof, is adapted to support a latch mechanism. A latch member 68 forms a portion of the latch mechanism, is pivoted on one of the stub shafts 60 and secured thereto by means of a snap ring 70. One end 71 of the latch member 68 is adapted to engage the tab 44 that extends from the platform 27. A hook portion 72 extends integrally from another side of the latch member 68, remote from the portion 71, and a catch member 73, that is pivoted as at 74 to the angle member 57, has a shoulder 75 that is adapted for cooperation with the hook portion 72. A pin 76 extends laterally from the free end of the catch member 73 and a tension spring 77 is disposed between the pin 76 and a pin 78 carried by the latch 68. Another pin 80, extending from the surface of the angle member 57, serves to limit movement of the latch member 68, while movement of the catch 73 is limited by engagement thereof with the plate 61. The two extreme positions of the latch 68 and the catch 73 are shown by the solid and dotted lines in Fig. 7.

As shown in Fig. 7, and for a purpose that will be hereinafter more fully described, the angle member 58 serves to support a switch actuating plate member 81.

As shown in Figs. 4 and 7, one of the vertical frame members 15 and the rail member 25 serve to support a vertically adjustable cam 82 that is mounted on a wedge 83 and clamped between surfaces of the members 15 and 25 by means of a clamping member 84 and a thumb screw 85. The thumb screw 85 rotatably extends through the clamping member 84 and threadably engages the wedge 83. Accordingly, the vertical position of the cam 82 may be established as desired. The pin 76, that extends from the free end of the catch member 73, is adapted for engagement with a lateral contoured surface of the cam 82 whereby to move the catch member 73 to the dotted line position, as shown in Fig. 7, and permit the latch 68 to be moved to the dotted line position as also shown in Fig. 7, and in response to the force of the tension spring 77. When the latch member 68 is moved to this dotted line position, the platform, as normally supported thereby, is permitted to fall freely from the retained position at some predetermined point along the rods 26. When the nut 56 is moved to a position adjacent the lower end of the screw 45, the portion 71 of the latch 68 will be engaged by a latch reset member 86 that is carried by and disposed upwardly from the angle member 22 adjacent the collar 46. Means are provided, by way of a screw arrangement 87, to adjust the vertical position of the latch reset member 86.

As shown in Fig. 1, one of the vertical frame members 15 is adapted to support a lower limit switch 88, an upper limit switch 90 and a loading position switch 91. The actuating arms of the switches 88, 90 and 91 are positioned for selective engagement by the switch operating member 81 that is carried by the nut angle member 58. Additionally, suitable starting control mechanism is provided for actuating the device and particularly the motor 55.

Figure 8:
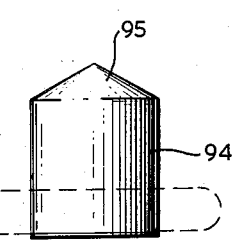
Fig. 8 is an enlarged detail view showing a deformable pellet that may be employed herewith.

As shown in Figs. 1 and 2, the base plate member 13 is adapted to support a block 92 in the central area thereof; the block 92 having a centrally disposed recess 93 in which a deformable pellet 94 is adapted to be positioned. The deformable pellet is shown in detail in Fig. 8 and may be generally cylindrical with a conical end portion 95. The pellet 94 may be made from any suitable material such as, for example, lead or the like, for a purpose to be hereinafter more fully described. As shown in Fig. 2, a photoelectric cell 96 is carried by a plate 97 adjacent one of the lower cross frame members 14 and a light source 98 is adjustably carried on a stand 100 that is mounted on the base plate 13. The pellet 94 is positioned to interrupt the path of light extending from the source 98 to the photoelectric cell 96.

In operation of the present device, the platform 27 is normally in the position shown in Figs. 1 and 2 and an article to be shock tested, as indicated at A, is secured to the surface 30 of the platform through utilization of one or more of a plurality of threaded holes 101 in the platform surface 30. The construction and arrangement of the switches 88, 90 and 91 are such that current will be applied to drive the motor 55 by actuation of these swtiches as will be described hereinafter. The particular wiring system for the device hereof is conventional and has not been illustrated. Upon normal energization of the device, through a suitable switch and button arrangement 102 mounted on one of the frame members 15, the motor 55 will be energized, whereby to drive the screw 45 in a direction to cause upward travel of the nut 56 and an associated upward travel of the platform 27 by reason of the engagement of the latch 68 with the tab 44 carried by the platform. Upward travel of the nut and platform continues until the pin 76 engages the cam 82, whereby to release the latch 68 and permit the free downward travel of the platform 27. Thereafter, the nut 56 continues its upward travel until the switch actuating member 81 engages the upper limit switch 90 which serves to reverse the direction of rotation of the motor 55 and the screw 45 and cause downward travel of the nut 56. The platform 27 and the article A carried thereby is in free fall after being released by the latch 68 until the surface 35 of the strike 34 engages the pellet 94 to deform the pellet into a shape as generally shown by the dotted lines in Fig. 8. The nut 56 continues downward travel and passes the switch 91 without actuating this switch. This travel is continued until the nut 56 passes the tab 44 and the latch 68 is reset by engagement thereof with the reset member 86. Thereafter, the switch actuating member 81 engages the lower limit switch 88, again to reverse the direction of rotation of the motor 55 and cause upward travel of the nut 56. The latch member 68 again engages the tab 44, thus to raise the platform 27 toward the position shown in Figs. 1 and 2. Upon engagement of the switch actuating member 81 with the loading position switch 91, operation of the motor 55 is discontinued. The photoelectric cell 96 serves to interrupt delivery of energy to the motor 55 in the event no pellet 94 is in position in the recess 93, or in the event a deformed pellet remains in this recess to prevent dropping of the platform at such a time that would cause damage to both the platform and any article mounted thereon.

Figure 9:
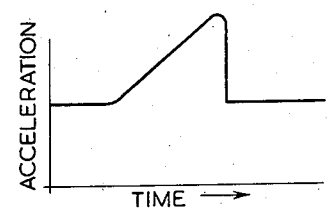
Fig. 9 is a graph illustrating the saw-tooth shape of the shock impulse produced by the present apparatus.

As shown in Fig. 9, the saw-tooth shape of the shock wave imparted by this device is clearly evident, with the acceleration-time factors and height of the pulse being determined by the distances of downward travel of the platform 27, which distance is determined by the position of the cam 82 and the action thereof in releasing the catch 73 and the latch 68. Plastic deformation of the pellet 94 serves rapidly to stop downward movement of the platform 27 without rebound or other extraneous shock impulses being applied to the article being tested.

It may thus be seen that the device of this invention is relatively simple and may be utilized in production situations for the shock testing of various articles. The particular size and shape of the pellet 94 is a matter of choice and depends largely upon the wave form desired in connection with the deceleration of the platform 27 and the article carried thereby. The automatic nature of the device is such as to permit continuous operation thereof.

Having thus described the invention and the present embodiment thereof, it is desired to emphasize the fact that many modifications may be resorted to in a manner limited only by a just interpretation of the following claims.

We claim:

1. In a drop testing apparatus for producing a sawtooth shaped shock wave impulse, said apparatus having a vertically disposed frame structure, a platform mounted for vertical travel in said frame structure, said platform being adapted to carry an article to be shock tested, a platform guiding structure carried by said frame structure, means for raising said platform to a predetermined height, a base structure, a permanently deformable pellet carried by said base structure and extending thereabove, and strike means carried by said platform and adapted for engagement with and deformation of said pellet upon free fall of said platform from said predetermined height, the combination with said drop testing apparatus of a platform guiding structure engaging and vertical position control mechanism comprising: vertically elongated guides carried by said platform and slidably engaging said guiding structure, said guides being disposed in parallel relationship; a latch forming a portion of said platform raising means and adapted for vertical travel within said frame structure; means for connecting said latch to said platform; and means for releasing said latch upon elevation of said platform to said predetermined height to permit said free fall of said platform, said latch being thereafter adapted for downward travel and reconnection with said platform.

2. In a drop testing apparatus for producing a sawtooth shaped shock wave impulse, said apparatus having a vertically disposed frame structure, a platform mounted for vertical travel in said frame structure, said platform being adapted to carry an article to be shock tested, a platform guiding structure carried by said frame structure, means for raising said platform to a predetermined height, a base structure, a permanently deformable pellet carried by said base structure and extending thereabove, and strike means carried by said platform and adapted for engagement with and deformation of said pellet upon free fall of said platform from said predetermined height, the combination with said drop testing apparatus of a platform guiding structure engaging and vertical position control mechanism comprising: vertically elongated guides carried by said platform; roller means disposed between said guides and said guiding structure, said guides being rigidly connected together to dispose and maintain said guides in parallel relationship; a latch forming a portion of said platform raising means and adapted for vertical travel within said frame structure; means for connecting said latch to said platform; and means for releasing said latch upon elevation of said platform to said predetermined height to permit said free fall of said platform, said latch being thereafter adapted for driven downward travel and reconnection with said platform.

3. In a drop testing apparatus for producing a sawtooth shaped shock wave impulse, said apparatus having a vertically disposed frame structure, a platform mounted for vertical travel in said frame structure, said platform being adapted to carry an article to be shock tested, platform guiding rods carried by said frame structure, means for raising said platform to a predetermined height, a base structure, a permanently deformable pellet carried by said base structure and extending thereabove, and strike means carried by said platform and adapted for engagement with and deformation of said pellet upon free fall of said platform from said predetermined height, the combination with said drop testing apparatus of a platform guiding rods engaging and vertical position control mechanism comprising: vertically elongated guides carried by said platform; roller means disposed between said guides and said guiding rods, said guides being rigidly connected together to dispose and maintain said guides in vertical parallel relationship; a latch forming a portion of said platform raising means and adapted for vertical travel within said frame structure; means for connecting said latch to said platform; cam means carried by said frame structure for releasing said latch upon elevation of said platform to said predetermined height to permit said free fall of said platform, said latch being thereafter adapted for driven downward travel; and means carried by said base structure for reconnecting said latch with said platform.

(References on following page)

References Cited in the file of this patent

UNITED STATES PATENTS

| | | | |
|---|---|---|---|
| 9,941 | Root | Aug. 16, | 1853 |
| 1,449,442 | Pope | Mar. 27, | 1923 |
| 1,604,089 | Topfl | Oct. 19, | 1926 |
| 1,604,141 | Amsler | Oct. 26, | 1926 |
| 1,741,811 | Birmingham | Dec. 31, | 1929 |
| 2,362,484 | Hickman | Nov. 14, | 1944 |
| 2,496,420 | Stern | Feb. 7, | 1950 |
| 2,539,418 | Grogan | Jan. 30, | 1951 |
| 2,579,503 | Lubin et al. | Dec. 25, | 1951 |
| 2,627,596 | Andrews | Feb. 3, | 1953 |
| 2,648,975 | Eves | Aug. 18, | 1953 |
| 2,653,679 | Hamilton | Sept. 29, | 1953 |
| 2,656,711 | Tschudi | Oct. 27, | 1953 |
| 2,660,880 | Vivian | Dec. 1, | 1953 |
| 2,662,392 | Sullivan | Dec. 15, | 1953 |
| 2,732,040 | De Vost | Jan. 24, | 1956 |
| 2,740,286 | De Vost | Apr. 3, | 1956 |
| 2,767,573 | De Vost et al. | Oct. 23, | 1956 |

OTHER REFERENCES

Morrow et al.: "Sawtooth Shock as a Component Test," Journal of the Acoustical Society of America, vol. 28, No. 5, pp. 959–965, September 1956.